March 12, 1940.   K. F. RODGERS   2,192,986
VARIABLE CONDENSER
Filed July 31, 1937

INVENTOR
K. F. RODGERS
BY J. MacDonald
ATTORNEY

Patented Mar. 12, 1940

2,192,986

UNITED STATES PATENT OFFICE 2,192,986

VARIABLE CONDENSER

Karl F. Rodgers, New York, N. Y., assignor to Bell Telephone Laboratories, Incorporated, New York, N. Y., a corporation of New York Application July 31, 1937, Serial No. 156,640

5 Claims. (Cl. 175—41.5)

This invention relates to condensers and more particularly to a variable condenser.

The object of the invention is to provide an improved variable condenser structure suitable for use where a high precision and a low torque condenser is required.

A feature of the invention resides in means for supporting the stator plates.

Another feature resides in a stop arrangement for the rotor plates.

Another feature resides in electrical connection means between a rotor assembly and an end plate of the frame.

Another feature resides in an arrangement in the rotor set of plates that permits bending or removal of portions of the endmost plates of the rotor set to change the characteristic of the condenser.

Features in addition to those above mentioned reside in a low torque and low friction structure and in a wear resisting end-thrust bearing arrangement.

In the drawing and considering that the condenser is in a vertical position:

Fig. 3 is drawn on an enlarged scale relative to Figs. 1 and 2;

Figure 1:
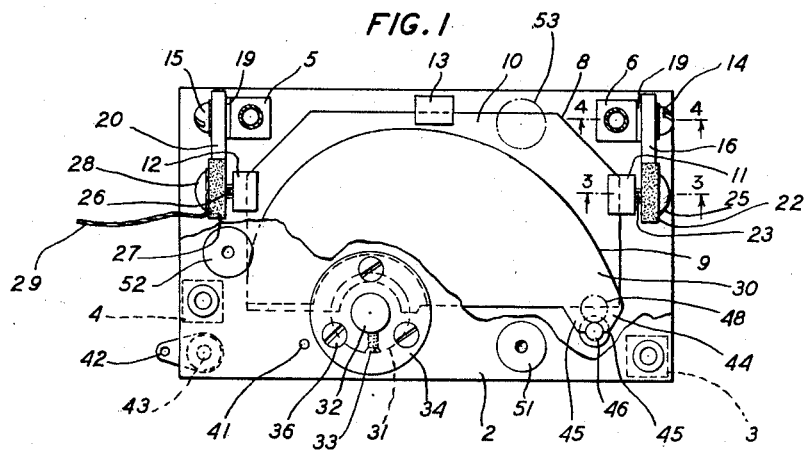
Fig. 1 is a top plan view of the condenser with a portion of the top plate removed.
Figure 3:
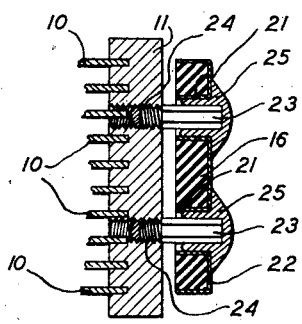
Fig. 3 is a view, partly in section, of a portion of the stator assembly and a supporting means for the stator assembly and taken in the direction of the arrows on the line 3—3 in Fig. 1.
Figure 4:
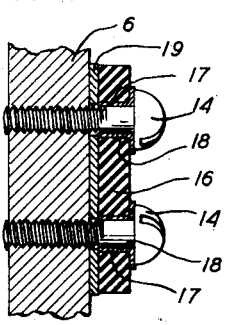
Figure 5:
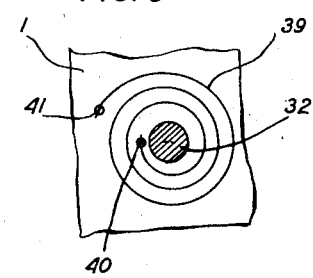

Fig. 4 is a view, partly in section, of another portion of the supporting means for the stator assembly and taken in the direction of the arrows on the line 4—4 in Fig. 1. Fig. 4 is drawn to the same scale as Fig. 3; and Fig. 5 is a plan view of an electrical connecting means for the rotor assembly and taken in the direction of the arrows on the line 5—5 in Fig. 2. Fig. 5 is drawn on an enlarged scale relative to Fig. 2.

In variable condensers where comparatively high precision is required it is important that the stator and rotor plate assemblies be so set relative to each other that the plate members are in exact parallelism at all times and that this condition of parallelism will not be changed in service.

It is also of importance, particularly in signal translating and transmitting systems, that the condenser does not operate to produce false signals in the system such, for instance, as might be produced by relatively moving contacts in the condenser.

It is also important in condensers used in systems as above mentioned that the condenser have a low torque so that it may be operated by means of a comparatively low power motor such for instance as a motor operating in accordance with changes in the transmission characteristics of a line system, such changes being due, for instance, to changes in atmospheric conditions. When a low torque condenser is used for the purpose above mentioned, it is also important that there be no residual force in the condenser structure sufficient to move the rotor of the condenser from a position of rest.

When stop members are provided in the condenser structure to limit the extent of relative movement of the plates, it is also important that the impact between the stop members does not cause a change in the setting of the plates.

In this invention:

The supporting means for the stator plates are so arranged that the stator plates may be brought, during manufacture of the condenser, into a required position so that they will be in exact parallel spaced relation with the plates of the rotor assembly and without introducing any stresses which might later tend to cause movement of the stator assembly from the required position.

A coiled conductor is provided as a continuous electrical connection between the rotor assembly and a terminal member.

The bearings in the condenser with the exception of an end-thrust bearing are merely alignment bearings and have no weight supporting function. The end-thrust bearing carries the entire weight of the rotor assembly and the contacting surfaces of the end-thrust bearing are of comparatively small areas. Also the cooperating parts of the end-thrust bearing are made of relatively matched and comparatively hard materials to reduce to a minimum both friction and wear.

Stop means are provided to limit the extent of rotation of the rotor assembly, the stop means having no connection with the stator plates.

Figure 2:
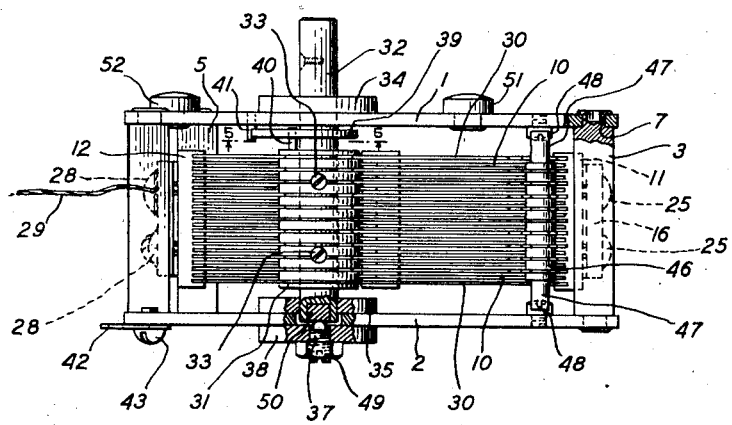
Fig. 2 is a side elevational view of the condenser, partly in section.

With reference to Figs. 1 and 2 of the drawing, 1 and 2 are respectively top and bottom plates of a frame, the plates being held in spaced relation by means of rods 3, 4, 5 and 6. The rods may be square in cross-section and have reduced round end portions 7 extending through apertures in the plates 1 and 2 and the outer end portions being spun over against the outer surfaces of the plates 1 and 2. The top and bottom plates 1 and 2 and the rods 3, 4, 5 and 6 serve as a frame structure for supporting the stator 8 of assembled condenser plates and a rotor 9 of assembled plates.

The stator 8 comprises a plurality of plates 10 of electrical conducting material held in spaced relation by means of tie bars 11, 12 and 13 of conducting material. The tie bars 11, 12 and 13 are slotted to receive edge portions of the plates 10 and are in electrical connection with the plates 10. The tie bars 11 and 12 are located on opposite sides of the set of stator plates 10 and in cooperation with other elements to be subsequently described serve as supporting means for the stator plates 10. The tie bar 13 is located at an intermediate offset point between the tie bars 11 and 12 and serves as an intermediate connector and spacer bar for the plates 10.

I have found that it is of some advantage to have the top and bottom end plates of the frame and the stator plates all made of the same material to prevent relative strain or movement of these parts under changes in temperature since such changes would in some instances cause disalignment of the stator plates.

The rods 3 and 4 serve to hold the top and bottom plates 1 and 2 of the frame in spaced relation. The rods 5 and 6 serve to hold the top and bottom plates 1 and 2 of the frame in spaced relation and also serve as part of the supporting means for the stator 8. The rods 5 and 6 are transversely drilled and tapped to receive respectively screws 14—14 and 15—15. The screws 14—14 as shown in Figs. 1 and 4 extend through an apertured slab 16 of insulating material and enter the rod 6. The apertures 17—17 in the slab 16 are larger in diameter than the diameter of the shank portion of the screws 14—14. A flanged bushing 18 adapted to receive the shank portion of a screw 14 is located in each aperture 17 and directly beneath the head of the screw. The flange of the bushing is interposed between the head of the screw and the outer surface of the slab 16. The bushings 18 may be made of comparatively soft metal or insulating material and serve as cushioning means between the screws 14 and the apertured slab 16 of insulating material to prevent fracture of the slab 16 when the screws 14 are tightened and also serve as bushings between the shank portions of the screws and the apertured portions of the slab to prevent lateral movement of the slab. An apertured strip 19 of comparatively soft metal or insulating material is interposed between the inner face of the slab 16 and the outer face of the rod 6 to further protect the slab 16 from fracture when the screws 14 are tightened. The slab 16 and the apertured strip 19 are held tightly pressed against the outer face of the rod 6 by means of the screws 14—14, the strip 19 being interposed between the slab 16 and the rod 6. To insure securement of the screws 14—14 in the threaded apertures in the rod 6, I have found it preferable to apply a small quantity of solder to the threaded ends of the screws and to the adjacent apertured portion of the rod 6. An apertured slab 20 of insulating material is supported by the screws 15 as shown in Fig. 1 against the rod 5 in the same manner as the slab 16 is supported by the screws 14—14 against the rod 6. The slabs 16 and 20 of insulating material are identical in structure and provide insulating supporting means for the stator 8.

Spaced apertures 21 are provided in the free end of slab 16 as shown in Fig. 3 and the free end of slab 16 is provided with a metallic coating 22 as shown in this figure and in Fig. 1. The coating 22 is applied to the outer face of the slab 16, adjacent the apertures 21 and to the inner surfaces of the apertures to provide a coating of strongly adherent solderable material around and within the apertures. The metallic coating may be applied by spraying the free end of the slab 16 with a metallic compound and firing at a comparatively high temperature or may be applied in any other manner found practicable. I have found that silver may be readily applied to the slab 16 and that this metal provides a strongly adherent solderable coating. The metallic coating 22 is applied to the slab 16 to provide a metal surface to which studs 23 of the stator assembly may be joined by means of solder or other comparatively low melting point metal. The studs 23 are male threaded on one end to enter drilled and tapped holes 24 in the tie bar 11 as shown in Fig. 3 and have outer ends adapted to enter the apertures 21 in the slab 16. The outer ends of the studs 23 may be made hexagonal in cross-section to facilitate turning of the studs 23 into the drilled and tapped holes 24 in the tie bar 11. The apertures 21 in the slab 16 of insulating material are much larger in diameter than the diameter of the stud 23.

When the stator assembly 8 is being mounted in the structure, the stator assembly is placed precisely in position and held in this position by means of a suitable jig. The slab 16 is then secured to the rod 6 by the screws 14—14 as described above. Molten metal is then flowed around the unthreaded ends of the studs 23 and into the apertures 21 in the slab 16 of insulating material and over adjacent portions of the metal coating 22. A sufficient quantity of molten metal is applied in the apertures 21 and around the unthreaded ends of the studs 23 and over the adjacent surfaces of the metal coating 22 to hold the stator assembly in required position when the metal cools. The hexagonal shape of the studs 23 in addition to facilitating turning of the studs into the tapped holes in the tie bar also assists in flowing the metal of the jointure into the excess space in the apertures. The molten metal when cooled forms a cap 25 closely embracing and also adhering to the unthreaded end of the stud 23 and adhering to the metal coating 22 on the slab 16 of insulating material. I have found it necessary for this condenser which is for exacting service to use a metallic coating on the insulating slab. However, with careful flowing in or casting of metal on the studs and in the apertures, it would not be necessary to coat the insulating support in all cases. The arrangement above described provides a means for mounting one side of the stator assembly on the slab 16 of insulating material. The opposite side of the stator assembly is mounted on the slab 20 of insulating material in a similar manner, the slab 20 being apertured on its free end to receive studs 26 of like form to the studs 23 and the slab 20 having a coating 27 of metal on its free end. The studs 26 are threaded into threaded holes in the tie bar 12 and the unthreaded ends of the studs 26 are anchored to the coating 27 of metal on the slab 20 by means of caps 28. The caps 28 are formed by flowing metal around the unthreaded ends of the studs 26 and within the apertures in the free end of the slab 20 and over adjacent surfaces of the coating 27. A terminal 29, such for instance as a suitable length of bare stranded wire, is applied to one of the studs 26 and has an end portion embedded in the respective cap 28. Since it is common practice to connect a circuit wire to a terminal by soldering the parts together, it is preferable that the metal used in forming the caps 28 be of a higher melting point than the common run of solder used in making connections between a wire and a terminal so that the material of the caps 28 will not be softened by the heat applied during the soldering of the circuit wire to the terminal and there will be no consequent shifting of the stator assembly during the soldering operation. It is to be noted that the coatings 22 and 27 of metal on the respective slabs 16 and 20 of insulating material do not extend over the whole surface of the slabs but are only on the end portions in which the studs 23 and 26, respectively, are secured. The slabs 16 and 20 of insulating material, therefore, insulatingly support the stator assembly in the frame.

The rotor 9 comprises a set of spaced plates 30 supported in spaced relation on an annularly grooved metal sleeve 31, supported on a rotor shaft 32 and held thereto by means of set screws 33. The rotor shaft 32 is journaled in bearings 34 and 35 mounted on the respective end plates 1 and 2 of the frame, the bearings being secured to the end plates by means of screws 36. An adjustable end-thrust bearing 37 screw-threaded into a ring 38, secured to the end plate 2, supports the weight of the rotor 9. The structure of the end-thrust bearing and its function will be subsequently described.

The metal sleeve 31 of the rotor 9 is electrically connected to the frame of the condenser by means of a coiled ribbon 39 of conducting material. The ribbon 39 is coiled in the form of a flat spiral as shown in Fig. 5 and encircles the rotor shaft 32. The inner end of the ribbon 39 is secured to a metal pin 40 which, as shown in Fig. 2, projects from the metal sleeve 31 and parallel with the rotor shaft 32. The outer end of the ribbon 39 is secured to a metal pin 41 which is secured in the end plate 1 and projects inwardly of the frame. The ribbon 39 is made of very thin soft temper sheet metal having a low modulus of elasticity to eliminate any spring action which would introduce torque in operation or tend to cause rotation of the rotor assembly when at rest. The plane of the spiral is horizontal and the ribbon 39 is arranged to provide a large section modulus or stiffness against vertical deformation with the least stiffness toward horizontal operating forces. A terminal 42 secured to the end plate 2 by means of a screw 43 is provided so that a circuit wire may be electrically connected to the frame. The ribbon 39 provides a continuous electrical connection between the rotor and the frame at all times and eliminates all chance of the development of false signals such as are produced for instance by sliding contacts.

Each plate 30 of the rotor 9 has a projection 44 near the outermost end portion as shown in Fig. 1. The projection 44 extends in the same plane as the plate 30 and from the straight edge portion of the plate. The projection 44 is recessed to provide spaced finger portions 45—45. The finger portions 45—45 extend into an annular groove in a stop bar 46 and are held in the annular groove by soldering the parts together or by connecting the parts in any other manner found practicable for securement of the parts. The stop bar 46 is annularly grooved at spaced intervals to receive the finger portions 45—45 of the rotor plates 30 and holds the outermost end portions of the rotor plates in spaced relation. The finger portions 45—45 of the endmost rotor plates extend around reduced end portions 47—47 of the stop bar 46 and are not connected to the stop bar 46 but are left free. This provides an arrangement whereby the endmost plates of the rotor assembly may be warped toward or away from the adjacent stator plates to slightly vary the characteristic of the condenser, or the free end portions of these outermost plates of the rotor may be reduced in area as required for the same purpose. The reduced end portions 47—47 of the stop bar 46 extend beyond the ends of the rotor assembly and normal to the planes of the rotor plates and almost to the inner surfaces of the end plates 1 and 2 of the frame. Filister head screws 48—48 are screw-threadedly supported in the end plates 1 and 2 of the frame in the path of movement of the end portions 47—47 of the stop bar 46. The end portions 47—47 of the stop bar 46 engage the head portions of the screws 48 when the rotor 9 of the condenser is rotated to bring substantially all portions of the rotor plates 30 into interleaving relation with the plates 10 of the stator 8 and stop further rotation of the rotor 9 in this direction. The filister head screws 48—48, therefore, serve as stops for the stop bar 46. The same object could be attained by slotting the end plates 1 and 2 and extending the stop bar 46 to extend into the slots. Since the stop bar 46 is carried by the rotor plates 30 and the screws 48—48 are mounted in the end plates 1 and 2 of the frame, there is no impact between the rotor 9 and the stator 10 but only impact between the rotor and the stops in the end plate of the frame. This arrangement prevents driving of the stator assembly from its adjusted position or fracturing of the slabs 16 and 20 of insulating material. The slabs 16 and 20, therefore, may be made of porcelain or other like frangible insulating material or of fibrous insulating material and the studs 23 and 26 of the stator assembly may be safely mounted in caps 25 and 28 of solder or other comparatively soft metal without danger of having the position of the stator changed by impact of the rotor.

When the rotor is moved to bring the rotor plates 30 out of interleaving relation with the stator plates 10, for instance in a clockwise direction from the position shown in Fig. 1, the extent of rotation in this direction is limited by the rod 4. The rod 4 as indicated in Fig. 1 is not located at the lower left corner of the frame but is located above the lower left corner and between the lower left corner and the slab 20 of insulating material to permit sufficient rotation of the rotor plates to bring the rotor plates entirely out of interleaving relation with the stator plates. The rotor cannot be rotated in a clockwise direction to such an extent as to bring the rotor assembly into engagement with the slab 20 since it is stopped by means of the rod 4. Since the rotor cannot be moved to strike the slab 20 or any of the portions of the stator supported thereby, there is no danger of the slab 20 of insulating material being fractured or of the stator being driven from its position.

The condenser shown and described is adapted to be operated in the position shown in Fig. 2, that is, with the rotor shaft 32 in a vertical position. In this position, the weight of the rotor assembly is carried by the end-thrust bearing 37. The end-thrust bearing 37 may be turned to a greater or less extent within the internally threaded ring 38 to raise or lower the rotor assembly as required to obtain correct spacing of the rotor plates relative to the stator plates. A lock nut 49 is provided on the end-thrust bearing 37 to prevent accidental turning of the end-thrust bearing 37. The end-thrust bearing 37 is made hemispherical on its upper end and is highly polished at this point and engages an insert 50 in the lower end of the rotor shaft 32. The insert 50 is made of material about equal to the hardness of the end-thrust bearing 37 to prevent undue wearing away of the parts. The portion of the insert 50 engaged by the hemispherical end of the bearing 37 is made flat to reduce to a minimum the area of contact between the parts. The flat portion of the insert is also highly polished. The structure, therefore, is a very low friction point bearing.

The condenser may be enclosed in a casing, not shown, with the rotor shaft extending through a wall or panel of the casing. Internally threaded spaced rings 51, 52 and 53 are supported on the upper surface of the end plate 1 of the frame to receive mounting screws, not shown, but which may extend through the wall or panel of the casing.

The rotor of the condenser may be rotated by means of a motor or manually by means of a knob, the motor or knob being connected to the rotor shaft 32. Since the particular means employed for rotating the rotor does not form part of the invention, no showing is made of such means.

Although the condenser has been described as being in a vertical position as shown in Fig. 2 is is obvious that the condenser may be set in a horizontal position and that if used in this position means may be provided in the structure for holding the rotor assembly against the end-thrust bearing.

Although in order to disclose the invention a particular structure has been shown and described, it is to be understood that certain changes may be made in the structure without departing from the spirit of the invention. For instance, it may be found preferable to support the slabs 16 and 20 at both ends by the identical means shown in Fig. 3 and described above. To do this the stator assembly 8 will be rigidly and precisely located with relation to the frame, the slab 16 will be placed in position on the four studs 23 and molten metal will then be flowed into the apertures in the slab 16 and over the adjacent portion of the metal coatings 22. In this arrangement the two apertured ends of the slab 16 will have metallic coatings, the coatings being separated by an uncoated area to insulatingly separate the ends.

What is claimed is:

1. In a variable electrical condenser, a frame comprising spaced plates and rods extending transversely of said spaced plates, apertured slabs of frangible insulating material supported on the rods of said frame and having apertured free end portions, cushioning means interposed between said slabs and said rods, metal coatings on the free end portions of said slabs and surrounding the apertures therein, a set of stator plates, tie bars connected to said stator plates, studs on said tie bars, said studs extending into the apertures in the free ends of said slabs and caps of metal embracing said studs in the respective apertures and adhering to the metal coating on said slabs.

2. In a variable electrical condenser, a frame comprising spaced plates and rods extending transversely of said spaced plates, apertured slabs of frangible insulating material supported on the rods of said frame and having apertured free end portions, screws extending through said slabs and into said rods, cushioning strips interposed between said slabs and said rods, and flanged tubular cushions interposed between the head portions of said screws and said slabs to prevent fracturing of said slabs, metal coatings on the free end portions of said slabs and surrounding and extending into the apertures therein, a set of stator plates, tie bars connected to said stator plates, studs on said tie bars, said studs extending into the apertures in the free ends of said slabs and caps of metal embracing said studs in the respective apertures and adhering to the metal coating on said slabs.

3. In a variable electrical condenser, a frame comprising end plates and rods extending transversely of said end plates and secured thereto, apertured slabs of frangible insulating material clamped to said rods and having apertured free end portions, screws extending through said slabs and into said rods, strips of relatively soft metal interposed between said slabs and said rods, relatively soft metal flanged tubular members disposed in apertures in said slabs and interposed between said screws and said slabs to prevent fracturing of said slabs by means of said screws, a coating of metal on the free end portions of said slabs, said coating surrounding the apertures in the free end portions of said slabs, a set of stator plates, tie bars connected to said stator plates and extending transversely of said stator plates, studs on said tie bars extending loosely into the apertures in the free end portions of said slabs and caps of solder embracing said studs within the apertures in said slabs and connected to said coating of metal.

4. In a variable electrical condenser, a frame, an apertured slab of ceramic insulating material supported by said frame, a cushioning strip interposed between said slab and said frame, a set of stator plates, a tie bar attached to said stator plates and holding said plates in spaced relation, studs mounted in spaced relation on said tie bar, polygonal head portions on said studs projecting into apertures in said slab, caps of low melting point metal extending through apertures in said slab and embracing said head portions of said studs and enlarged button-like head portions on said caps extending over portions of said slab.

5. In a variable electrical condenser, a frame, an apertured slab of ceramic insulating material supported at one end by said frame, a strip of cushioning material interposed between said slab and said frame, a coating of metal on the unsupported end portion of said slab, a set of stator plates, a tie bar attached to said stator plates and holding said plates in spaced relation, studs mounted in spaced relation in the side of said tie bar, hexagonal head portions on said studs projecting into apertures in said slab, caps of low melting point metal extending through said slab and embracing said head portions of said studs and enlarged button-like head portions on said caps extending over portions of said coating of metal on said slab and adhering to said coating of metal.

KARL F. RODGERS.